United States Patent [19]

Neier

[11] Patent Number: 4,756,626
[45] Date of Patent: Jul. 12, 1988

[54] FLUENT AND NONFLUENT MATERIAL MIXER

[75] Inventor: Benjamin R. Neier, Dodge City, Kans.

[73] Assignee: Roto-Mix, Inc., Dodge City, Kans.

[21] Appl. No.: 904,658

[22] Filed: Sep. 8, 1986

[51] Int. Cl.[4] .............................................. B01F 7/04
[52] U.S. Cl. .................................. 366/279; 366/313; 366/603
[58] Field of Search ............... 366/603, 309, 312, 313, 366/311, 279, 326, 331, 241, 64, 67, 184, 195–197

[56] References Cited

U.S. PATENT DOCUMENTS

| | | | |
|---|---|---|---|
| 1,779,571 | 10/1930 | Ullgren | 366/312 |
| 4,506,990 | 3/1985 | Neier | 366/603 |
| 4,515,483 | 5/1985 | Muller | 366/312 |
| 4,571,091 | 2/1986 | Pardo | 366/312 |

Primary Examiner—Robert W. Jenkins
Attorney, Agent, or Firm—Zarley McKee, Thomte, Voorhees & Sease

[57] ABSTRACT

A feed mixer includes a main chamber in which a rotor is located. The rotor includes at least one elongated wiper rigidly connected to a rotor bar for wiping contact with a curved wall portion of the chamber. The rotor bar is prevented from incurring any substantial pivotal movement and thereby maintains a substantially consistent and uniform angle between the wiper and the curved wall portion and wiping contact therewith. The rotor also includes a square in cross section axial center tube to which the rotor arms are connected and a circular in cross section axial drive shaft is positioned in the tube and extends the substantial length thereof. Right angle elements are positioned around the periphery of the shaft matingly engaging the inside right angle corners of the tube to lock the shaft to the tube for rotational movement therewith.

7 Claims, 4 Drawing Sheets

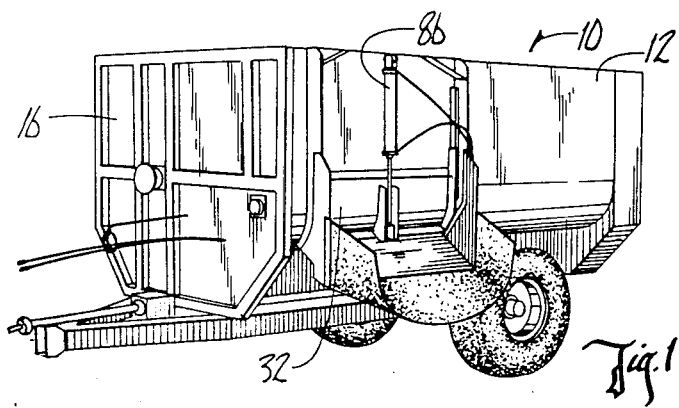
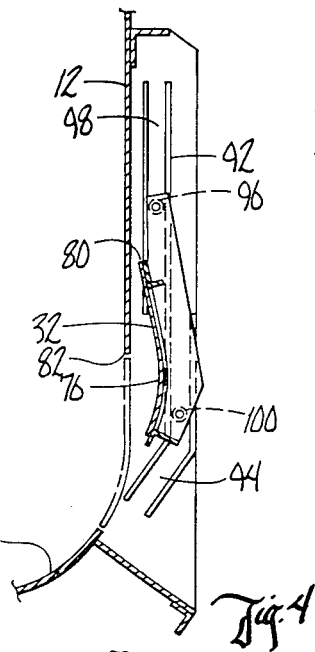
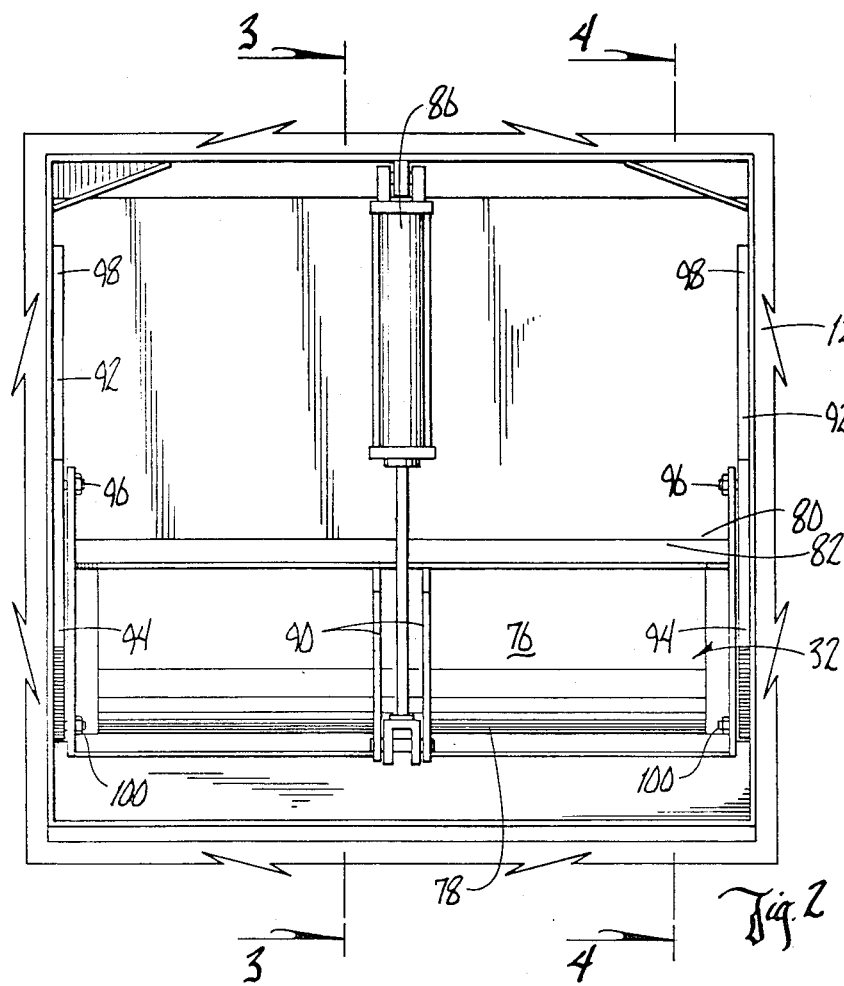
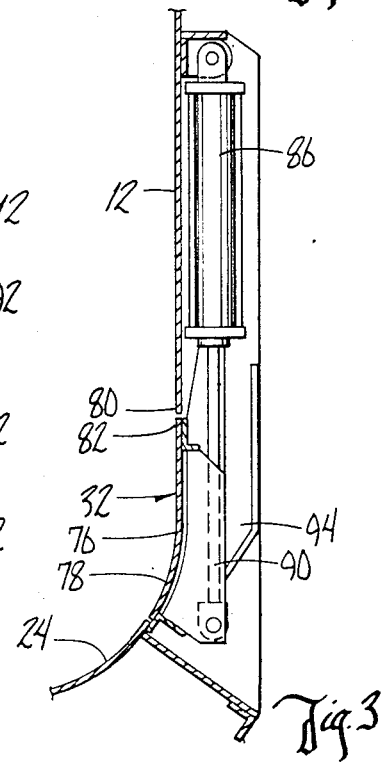

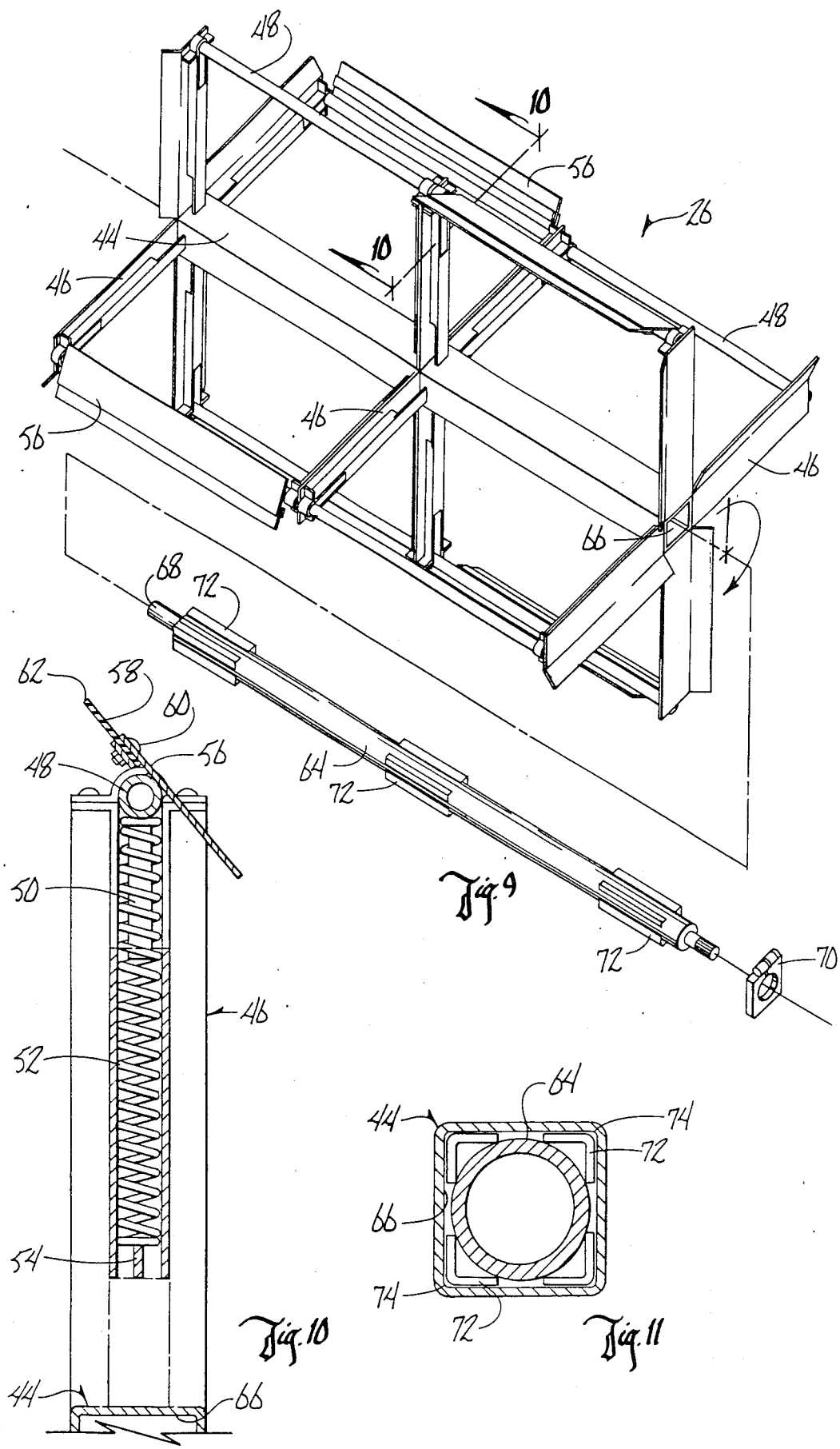

FLUENT AND NONFLUENT MATERIAL MIXER

BACKGROUND OF THE INVENTION

This invention is an improvement on the mixer of U.S. Pat. No. 4,506,990, Mar. 26, 1985, MIXER FOR FLUENT AND NONFLUENT MATERIAL, and U.S. Pat. No. 4,597,672, July 1, 1986, CENTER DISCHARGE MIXER FOR FLUENT AND NONFLUENT MATERIAL on which I am a co-inventor.

The radial straight paddles on the mixing and unloading augers, FIGS. 7 and 8, of the '990 patent may tend to allow hay to wrap around them unless chopped into small pieces. A different paddle construction is needed that will release long-stem hay for mixing and discharge purposes.

The wiper on the cross bar of the rotor in FIGS. 9–11 of the '990 patent were designed to pivot and also move radially of the rotor arms. The pivoting of the wiper allowed the wiper to raise up and away from the chamber wall and slide over heavy material like a mixture of molasses and corn. This design takes excessive horse power to operate and an improved design for the wiper assembly is desirable which will take less horse power to operate.

It also appears that the rotor of FIG. 9 of the '990 patent could be manufactured and assembled in a less costly and more simplified manner. A new rotor assembly design is needed.

It also appears that the discharge door of FIGS. 1, 2 and 4 of the '990 patent might be improved in terms of operation and simplicity of design to avoid mixed material blockages to the door opening and closing.

SUMMARY OF THE INVENTION

The paddles on the mixing and discharge augers have a convex leading surface with the outer ends trailing as the auger is rotated. The paddles are effectively the same length as the radius of the auger. This design prevents hay and other long-stem materials from wrapping around the paddles during the mixing and unloading operation thereby making it unnecessary to grind further long-stemmed plants including hay.

The rotor includes rotor bars adjacent the outer periphery to which wiper plates are rigidly connected for wiping contact with the curved wall of the main mixing chamber. The rotor bars are prevented from rotation. The trailing edge of the wiper plates engages the curved surface of the mixing chamber. This design provides a better wiping action with lower energy requirements.

The rotor includes a square in cross section axial center tube to which the rotor arms are connected and a circular in cross section axial shaft is positioned in the tube and extends the substantial length thereof. Right angle elements are positioned around the periphery of the shaft to matingly engage the inside right angle corners of the tube to lock the shaft to the tube for rotational movement therewith. This design is much less expensive in cost of materials and time in assembling.

The discharge door assembly includes a curved door with upper and lower tracks on either side. The upper track is substantially straight and vertically positioned with cooperating means located above the top edge of the door. The lower track extends laterally outwardly and upwardly from the lower side of the opening whereby movement of the door upwardly from a closed position pivots the door out of a position flush with the curved wall such that the upper edge of the door is moved to a position spaced from the adjacent edge of the opening allowing the door to move upwardly to the open position. This design allows for the door to open and close without interference from accummulated mixing materials interferring and permits the top edge of the door to clear the bottom edge of the opening since the door has to move out of the plane of the wall in which the opening is located.

BRIEF DESCRIPTION OF THE DRAWINGS

FIG. 1 is a perspective view of the mixer of this invention.

FIG. 2 is an enlarged fragmentary side elevational view of the discharge door assembly.

FIG. 3 is a cross-sectional view taken along line 3—3 of FIG. 2.

FIG. 4 is a cross-sectional view taken along line 4—4 of FIG. 2.

FIG. 9 is an exploded perspective view of the rotor illustrating the round drive shaft positioned in the square rotor axial tubing.

FIG. 10 is a cross-sectional view along line 10—10 in FIG. 9 illustrating the arrangement of the wiper blade on the rotor bar mounted on the rotor arms.

FIG. 11 is a cross-sectional view taken along line 11—11 in FIG. 6.

DESCRIPTION OF THE PREFERRED EMBODIMENTS

Figure 6:
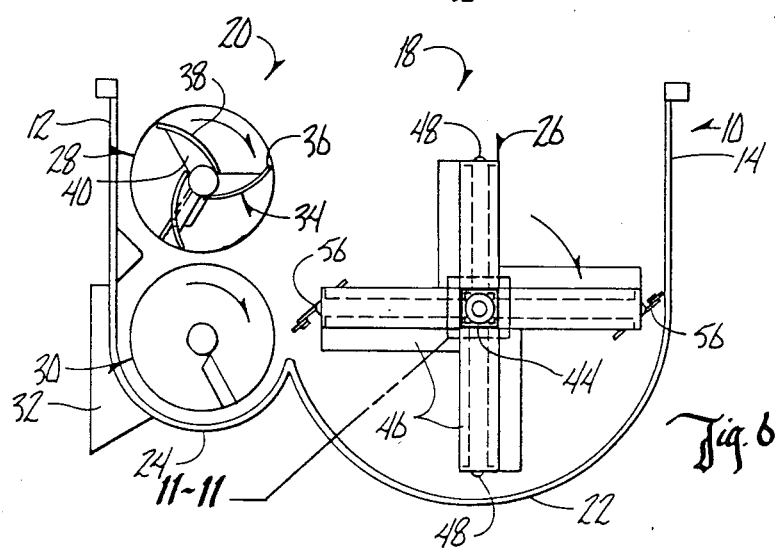
FIG. 6 is an end vertical view of the rotor and mixing augers.

The mixer of this invention is referred to in FIG. 1 by the reference numeral 10 as seen in FIGS. 1 and 6. The mixer 10 includes a sidewall 12 and an opposite sidewall 14. A forward end wall 16 is seen in FIG. 1. The mixer includes a main chamber 18 and an auxillary chamber 20 which include bottom walls 22 and 24, respectively. A rotor 26 is positioned in the main chamber 18 and stacked augers 30 operate in the auxillary chamber 20. A discharge unloading door 32 is seen in FIGS. 1–4.

Figure 5:
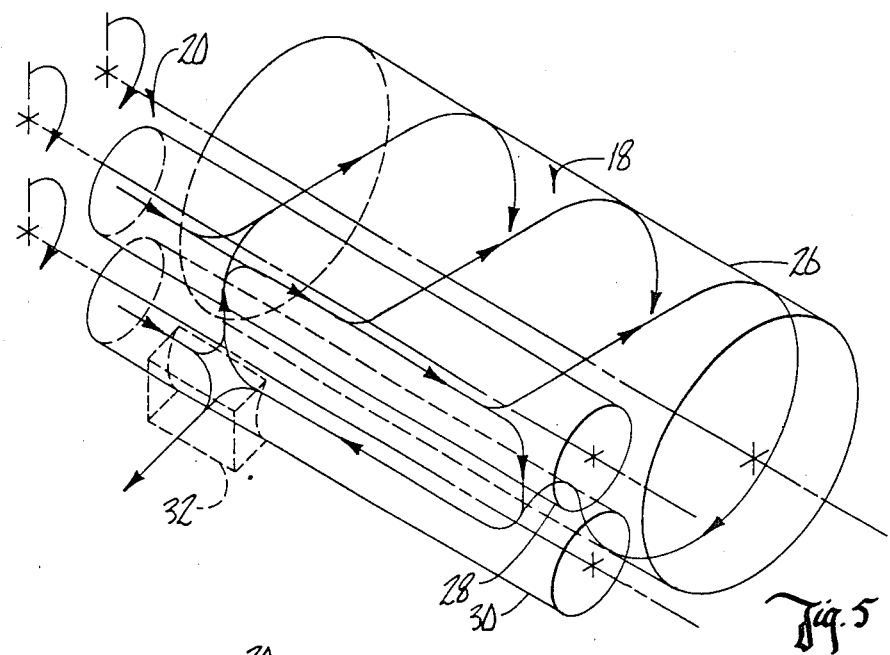
FIG. 5 is a flow diagram indicating the movement of the material being mixed as acted upon by the rotor and the mixing augers.
Figure 7:
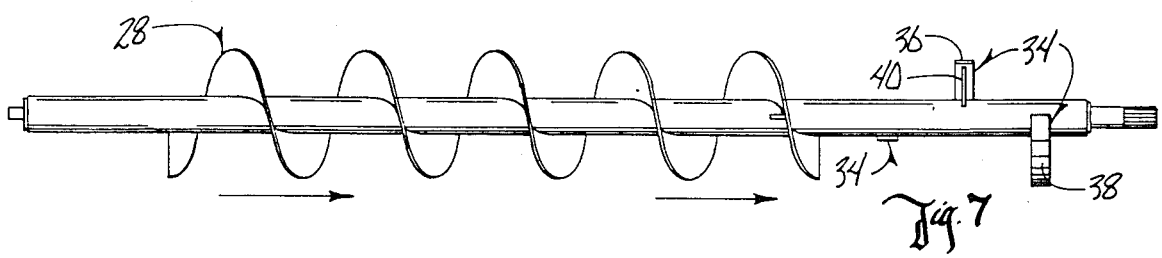
FIG. 7 is a side elevational view of the top mixing auger.

The flow of the material being mixed is seen in FIG. 5 wherein material is continuously cycled from the main chamber 18 into the lower portion of the auxillary chamber 20 where it is moved toward one end of the mixer by auger 30 where it is met by material moving in the opposite direction moved by the same auger. Curved paddles 34 serve to move the grain laterally out the discharge door 32 when open or upwardly to the top auger 28 whereupon the material being mixed is moved back to the right (as seen in FIG. 7) end of the auxillary chamber where material also may spill over into the main chamber 18. The paddles 36 serve to move the grain again laterally into the main chamber or downwardly to the lower auger 30.

Figure 8:
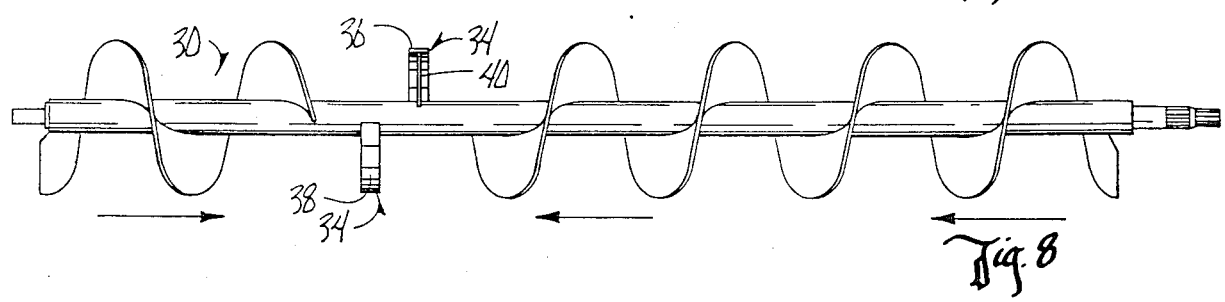
FIG. 8 is side elevational view of the bottom mixing auger.

The paddles 34 and 36, as seen in FIGS. 6–8, have a special design configuration that prevents material from becoming attached to them such as is sometimes the case with long-stemmed hay. The paddles are circumferentially positioned around the auger and extend radially and laterally thereof. Each of the paddles have a curved convex forward leading surface 38 for engaging material in the mixer and moving it laterally of the auger and the chamber. The curved surface is transversely flat along its length. As seen in FIG. 6, the outer end of the paddle is the trailing end as the auger rotates. The backside of the curved paddles is concave and includes a reinforcement plate element 40 which extends the length of the paddle and is affixed to the auger at its inner end. The effective length of the paddle is equal to the radius of the flighting, as seen in FIG. 6.

In FIGS. 6 and 9-11 details of the rotor 26 are shown. The rotor includes axial square tubing 44 and rotor arms 46 to which rotor bars 48 are connected. The rotor bars 48 are provided with pins 50 which are received in coil springs 52 located in the bars 46 and supported on a stop 54. A wiper plate 56 is rigidly connected to the rotor bar 48 at an angle, as seen in FIGS. 6 and 10. The wiper plate 56 includes a replaceable flight portion 58 secured by bolts 60. The cleaning edge 62 is on the trailing end of the wiper 56 as it rotates in a clockwise direction, as seen in FIG. 6. It is important that the cleaning edge 62 stays in contact with the chamber wall and not pivot away and allow material to come between the wiper and the chamber wall. Torque requirements for wipers that pivot versus those that did not have been compared. With a torque meter in the PTO of the driveline of both types of units the nonpivoting design of this invention required 15 to 40% less power, depending on the particular material being mixed. The greater savings in power were realized with the high density and weight materials such as molasses in feed which create a sticky hard-to-move material. The wiper of this design also gives a faster more positive cleanout especially in heavy materials such as fertilizer. Feedlot mixtures weigh 20 to 30 pounds per cubic foot while fertilizer mixtures weigh up to 60 pounds per cubic foot. If obstructions are hit in the operation the rotor bar 48 will move radially inwardly against the action of the spring 52 and then return to its fully extended position, as seen in FIG. 10, once the obstruction is passed. The power requirements for this wiper blade construction are substantially less than prior designs and the cleaning action is superior.

The rotor 26 of FIG. 9 can be quickly and inexpensively assembled and installed. The rotor is preassembled, as seen in FIG. 9, and placed in the main chamber 18. A drive shaft 64 is then inserted into the axial opening 66 of the axial tubing 44 from an opening in one end wall of the chamber. The stub shaft 68 is received in a bearing assembly 70 in the front end wall 16, as seen in FIG. 1. The shaft 64 is limited against travel to the left or forwardly by a lock element 70 which engages the end edges of the tube 44. The round drive shaft 64 is able to drive the square tubing 44 by the addition of right angle elements 72 which matingly engage the right angle corners 74 of the tubing 44, as seen in FIG. 11. The right angle elements ae placed at least at opposite ends and as shown in FIG. 9, are also positioned in the center of the shaft 64. The adaptation of a round shaft to drive square tubing is much less expensive than constructing a square shaft to matingly drive square tubing.

The unloading or discharge door assembly 32, as seen in FIGS. 1-4, includes a door 76 having the shape of the rounded wall areas 78 at the juncture of the sidewall 12 with the bottom wall 24, as seen in FIGS. 1 and 6. The problem is to provide a door which will not leak mixed material but will also open and close freely without being obstructed by the material. This is particularly a problem at the top edge 80 of the door which must clear the top edge 82 of the door wall opening, as seen in FIGS. 3 and 4, as the door moves from the closed position of FIG. 3 to the opened position of FIG. 4. A hydraulic cylinder 86 is mounted on the sidewall 12 and is connected to the door 76 by a pair of plates 90.

Each side of the door assembly includes upper guide tracks 92 and lower guide tracks 94. The upper guide tracks 92 are vertically oriented parallel to the sidewall 12 and receive a pivot pin 96 carried on the top side edge of a door extension member 98 extending above the door. The lower tracks 94 extend from the bottom end upwardly and outwardly and receive pivot pin 100. It is seen that because the pivot pin 96 is positioned a significant distance above the top edge 80 of the door that the pivot arm is lengthened thereby creating a larger arc through which the door pivots when the cylinder 86 is operated thereby making the top edge 80 clear the adjacent edge 82 of the wall 12 with the doors being opened and closed.

Figure 12:
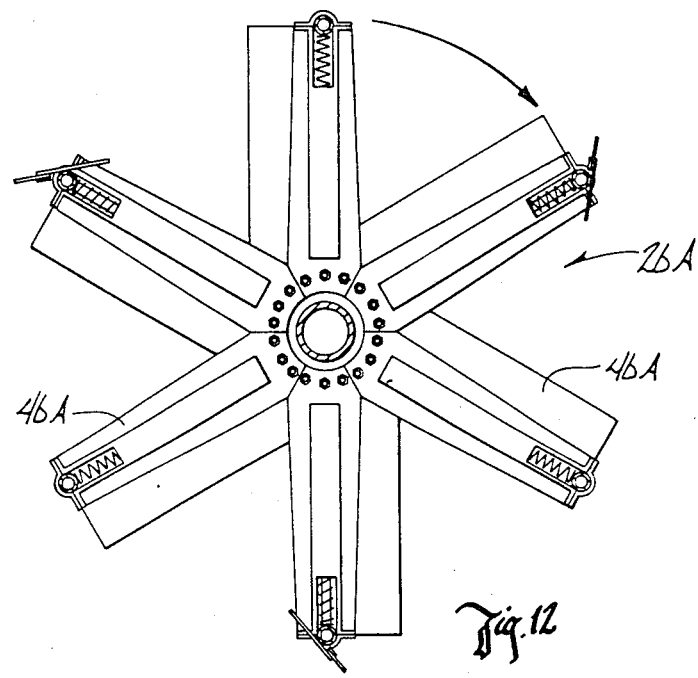
FIG. 12 is an end elevational view of an alternate embodiment rotor including six arms.

Depending on the conditions of use the rotor 26 may be constructed of four arms 46 or six arms 46A, as seen in FIG. 12. The axial tubing of the rotor 26A in FIG. 12 is of a conventional design compared to that of FIG. 9. The wiper plate 56 of FIG. 10 is utilized. Thus it is seen that the mixer has been shown and described herein which will accomplish at least all of its stated objectives.

What is claimed is:

1. A mixer for fluent and nonfluent material, comprising,
   a mixer tank including forward and rearward end walls, a bottom wall and opposite sidewalls,
   said bottom wall including a curved wall portion defining the bottom of a main chamber,
   a rotor including a plurality of elongated rotor bars adjacent the outer periphery thereof,
   means for supporting said rotor in said main chamber for rotation in a direction for movement of said rotor bars across said curved wall portion,
   said rotor having a diameter such that said rotor bars travel in an arc substantially conforming to and adjacent to said curved wall portion,
   drive means for rotating said rotor,
   means for supporting said rotor bars for movement radially of said rotor and means for urging said rotor bars radially outwardly of said rotor,
   at least one elongated wiper rigidly connected to a rotor bar for wiping contact with said curved wall portion in response to movement of said rotor bar thereacross and said urging means biasing said wiper towards said curved wall portion, and
   means for preventing any rotational movement of said rotor bar and thereby maintaining a substantially consistent and uniform angle between said wiper and said curved wall portion.

2. The mixer of claim 1 wherein said wiper blade is connected to said rotor bar intermediate its width thereby defining leading and trailing edges, said trailing edge only of said wiper position to contact said curved wall surface and said leading edge being substantially spaced from said curved wall surface.

3. The mixer of claim 1 wherein said rotor bar having said wiper includes pins received in coil springs positioned in rotor arms.

4. The mixer of claim 3 wherein said wiper is substantially flat over its substantial surface area.

5. A mixer for fluent and nonfluent material, comprising, a mixer tank including forward and rearward end walk, a bottom wall and opposite sidewalls, said bottom wall including a curved wall portion defining the bottom of a main chamber, a rotor including a plurality of elongated rotor bars adjacent the outer periphery thereof, means for supporting said rotor in said main chamber for rotation in a direction for movement of said rotor bars across said curved wall portion, said rotor having a diameter such that said rotor bars travel in an arc substantially conforming to and adjacent to said curved wall portion, drive means for rotating said rotor, said rotor including a square in cross section axial center tube to which rotor arms are connected and on the outer end of which said rotor bars are positioned, a circular in cross section axial shaft is positioned in said tube and extends the substantial length thereof, and right angle elements are positioned around the periphery of said shaft to matingly engage the inside right angle corners of said tube to lock said shaft to said tube for rotational movement therewith.

6. The mixer of claim 5 wherein said right angle elements have opposite ends welded to the outer surface of said shaft.

7. The mixer of claim 6 wherein said right angle elements are located at least at opposite ends of said shaft.

* * * * *